Nov. 25, 1969   J. A. POPE ET AL   3,480,113
PRESSURE LUBRICATION SYSTEMS
Filed Aug. 31, 1967   2 Sheets-Sheet 1

J. A. Pope + J. E. H. Appleby
INVENTORS
BY
Bierman + Bierman, Esqs.

Nov. 25, 1969     J. A. POPE ET AL     3,480,113
PRESSURE LUBRICATION SYSTEMS

Filed Aug. 31, 1967     2 Sheets-Sheet 2

J. A. Pope • J. E. H. Appleby

INVENTORS

Bierman + Bierman, Esqs.

BY

United States Patent Office 3,480,113
Patented Nov. 25, 1969

3,480,113
PRESSURE LUBRICATION SYSTEMS
Joseph Albert Pope, Bramhall, and John Edwin Herbert Appleby, Cheadle, England, assignors to Mirrlees National Limited, a British company
Filed Aug. 31, 1967, Ser. No. 664,707
Claims priority, application Great Britain, Oct. 7, 1966, 44,818/66
Int. Cl. F01m *1/00, 11/00*
U.S. Cl. 184—6                               7 Claims

ABSTRACT OF THE DISCLOSURE

A pressure lubrication system comprising a high pressure system and a low pressure system wherein there is a pressure intensifier located within a gudgeon pin in the piston, means for supplying the intensifier with lubricant from the low pressure system, the complementary parts of the piston and the intensifier adapted to be actuated by relative oscillating movement of the gudgeon pin within its bearing to provide cyclic pressure-intensified lubrication impulses.

---

This invention relates to pressure lubrication systems, and is particularly, though not exclusively, applicable to trunk pistons for pressure lubricated two-stroke cycle internal combustion engines and the like, such as interstage compressors, where the loading on the gudgeon pin is wholly, or substantially wholly, uni-directional. The invention, while having other applications, will however, for convenience, be particularly described with reference to such trunk pistons for two-stroke cycle internal combustion engines.

Such uni-directional loading gives rise to a problem in the lubrication of bearings, particularly the little end or gudgeon pin bearing, because even making use of the available lubricant pressure in the pressure lubrication system of the engine, it does not always allow restoration of a normal thickness of oil film after its displacement by a preceding loading cycle, keeping in mind that, unlike the big-end bearing, the relative rotary movement at the gudgeon pin is only oscillatory. With a four-stroke cycle engine, the momentum of the piston, and in some constructions also of the gudgeon pin, is arrested by the connecting rod at the end of the exhaust stroke and this results in reversal of the loading on the gudgeon pin, giving "lift" at the gudgeon pin bearing and re-establishment of the lubricating oil film, or at least of an effective thickness thereof, for receiving the combustion load of the next load cycle.

The reason why the gudgeon pin loading is uni-directional in two-stroke cycle engines is because the inertia forces due to the piston (and sometime of the gudgeon pin itself according to constructional design) seldom exceed, for example with an opposed piston engine, the gas forces due to compression at "in" centres (i.e. when the piston is as far "in" the cylinder as it will go); and the inertia forces at "out" centres, which is in the direction of the gas forces, both of these forces being carried by the gudgeon pin bearing.

It will be apparent that under such conditions, i.e., as a result of the forces described above, there will be a mechanical pressure of varying magnitude at the gudgeon pin bearing surfaces throughout the running of the engine which is at all times uni-directional and therefore operating adversely to the maintenance of the necessary oil film at the loaded bearing faces which the oil pressure of a normal pressure-lubrication system is insufficient to maintain.

The problem inherent in the preceding paragraphs has been met in the case of a cross-head construction engine by supplementing the oil pressure from the normal pressure lubrication systems at the relevant bearing surfaces through high pressure pump means external to the piston and actuated by linkage means responsive to the relative angular oscillating movement of the connecting rod.

The object of the present invention is to provide an improved means for intensifying the normal pressure of the engine lubricating system by novel means, in particular as applied to the gudgeon pin or little end bearing of a trunk piston as distinct from a cross-head construction.

The expression "trunk piston" is used herein in its normally accepted sense in the art, to define a piston which transmits to the cylinder wall the side thrusts resulting from the angularity of the connecting rod transmitted to it directly through the gudgeon pin.

According to the present invention, a pressure lubrication system for a trunk piston is characterised by a pressure intensifier means located within the piston, means for supplying said intensifier with lubricant from the said pressure lubrication system and complementary structional parts of the piston and intensifier adapted to be actuated by relative oscillating movement at the gudgeon pin bearing to provide cyclic pressure-intensified lubrication impulses thereat.

In the preferred embodiment of the invention, a trunk piston is characterised by a pressure intensifier pump means located within the overall dimensions of the piston and complementary pump-actuating means on the piston and gudgeon pin so constructed as to effect actuation of the intensifier pump through oscillatory relative angular movement of the connecting rod, means for supplying the inlet side of said pressure intensifier pump from the normal pressure lubrication system of the engine and means for conducting the output of the said pressure intensifier pump to the bearing surface of the gudgeon pin.

The trunk piston aforesaid may be further characterised in that the supplementary pump means is a reciprocating pump arranged with its axis at right angles to the axis of the piston and parallel to the axis of the gudgeon pin; or further characterised by at least one supplementary duct leading to another lubrication zone.

Figure 1:
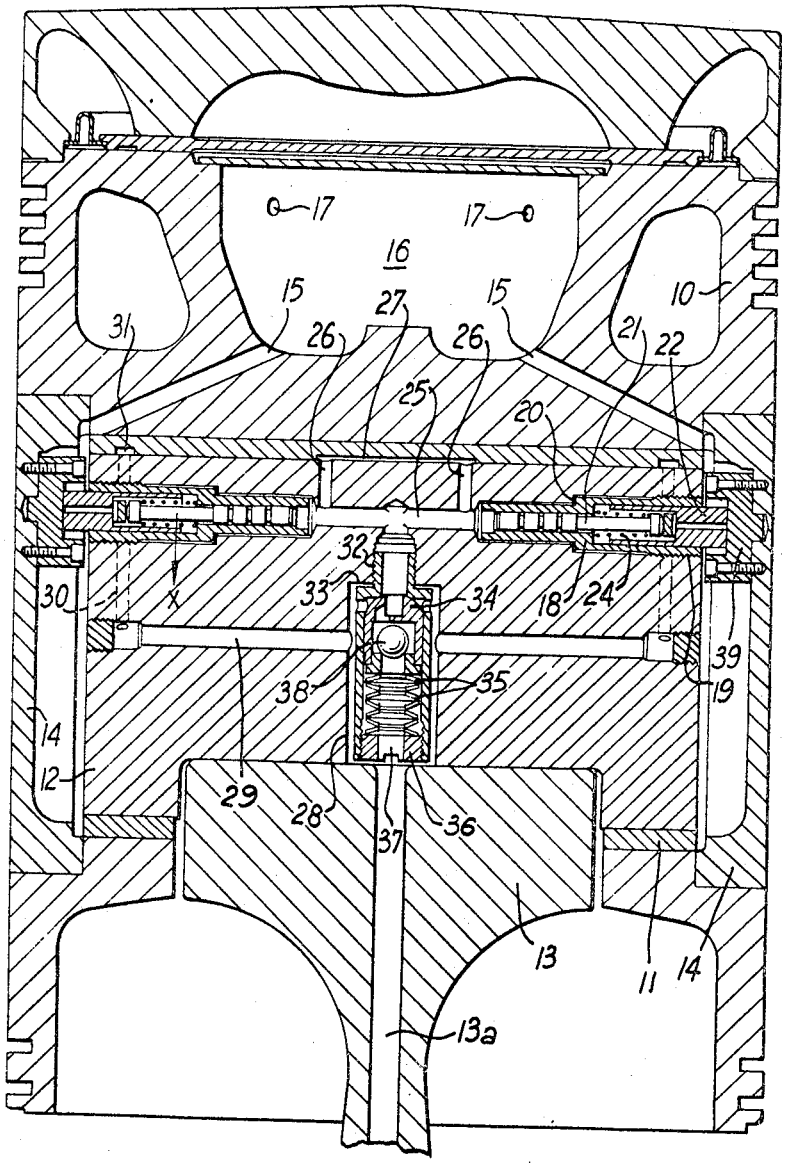
FIG. 1 is a longitudinal section of a trunk piston made in accordance with one example of the invention.
Figure 2:
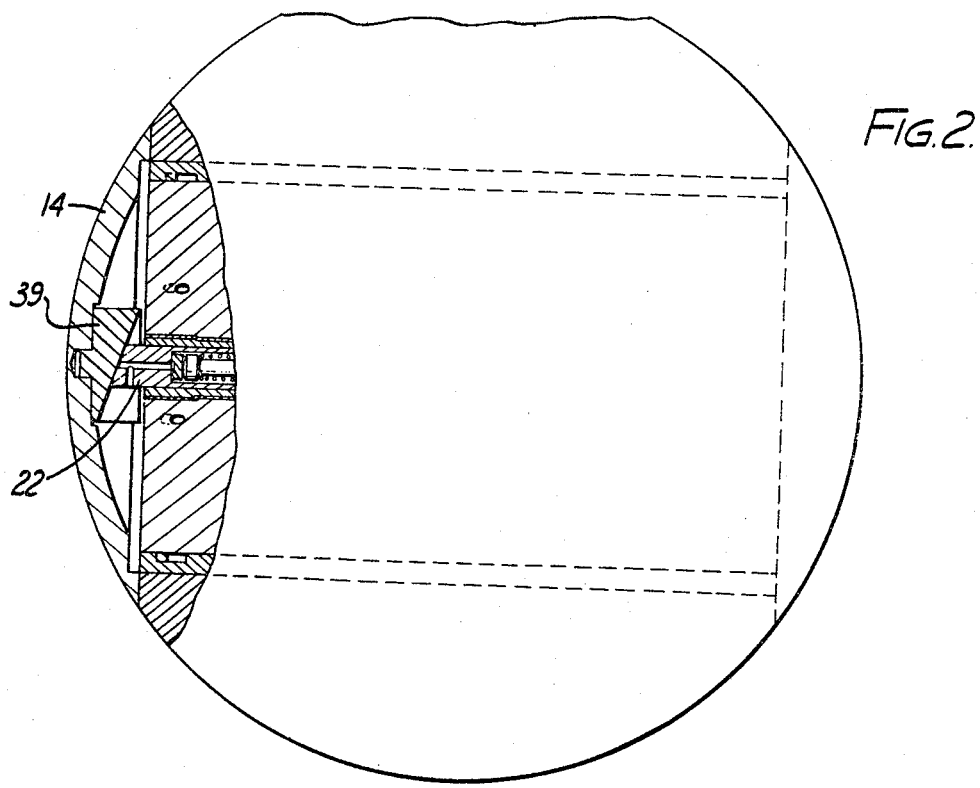
FIG. 2 is a part sectional plan of the trunk piston shown in FIG. 1.

As shown in the drawing, the piston body 10 is provided with a liner or bush 11 for a gudgeon pin 12 secured in any known manner to the end of the connecting rod 13. Dished end caps 14 are fitted to the body of the piston to close in the ends of the gudgeon pin, the cavities of which end caps are connected by ducts 15 leading to a cooling space 16 within the piston from which outlets 17 provide egress to the periphery of the piston. In the connecting rod 13 is the usual duct 13a fed by the pressure lubrication system (not shown) for conducting lubricating oil to the gudgeon pin bearing surface. Within the gudgeon pin, and parallel to the axis thereof, a pair of pressure intensifier pumps each consisting of a body part 18 having a screwed head 19 and a shoulder against which, and a complementary rebate shoulder in the gudgeon pin, is located a copper joint ring 20. The inner end of the body part 18 is formed in known manner complementary to a piston plunger 21 having annular grooves and operable by a tapper 22 and return spring 24. Except at the screwed portion and joint face the periphery of the body part 18 is a clearance fit in the complementary hole in the gudgeon pin. Such holes are connected at their inner ends by a through passage 25 and 26 to the periphery of the gudgeon pin, and to the complementary spreader groove 27 formed in the bush 11. Lubricating oil from the pressure lubrication system of the engine is supplied to the gudgeon pin and pump via the duct 13a aforesaid in the connecting rod. A valve chamber 28 is formed in the gudgeon pin from which lead passages 29 and 30 to supply arcuate grooves 31, located near the ends of the bush 11 to provide passage for oil to cool the bush and piston.

A combined non-return and pressure release valve is located in the valve chamber 28 having a screwed end 32 and a shoulder for a sealing ring 33. Within the body of the valve is a pressure release valve 34 loaded by a plurality of spring rings 35 secured by a closure plug 36 having a through passage 37. Within the release valve 34 is located a non-return ball valve 38.

Within the end caps 14 are located cams 39 complementary to the tappets 22 which are drilled to provide lubrication of the cam face.

In operation, while the engine is running, lubricating oil from the normal pressure lubrication system passes via the duct 13a, valve chamber 28 and ducts 29 and 30 to the arcuate semi-circular grooves 31 to the gudgeon pin. As the connecting rod oscillates, the cams 39 actuate the pistons 21 to provide impulses of lubricating oil at say 2000 p.s.i. via the ducts 26 and spreader groove 27 to lubricate the gudgeon pin outwardly from the centre zone thereof. The ball valve 38 operates as a non-return inlet valve to the pressure intensifier pumps by admitting thereto oil under pressure from the pressure lubricating system of the engine. The valve 34 will only open to release very high pressures which could cause damage by over high resistance to actuation of the intensifier pump pistons 21. The peripheral clearances for the pump bodies 18 prevent any distortion of the gudgeon pin being transmitted to the lapped cylinder portion of the intensifier pump. While the piston thereof also has clearance relative to the tappet 22 so that it can follow its own alignment in such cylinder. The cam is shaped to provide the impulse at an opportue low load moment for normal forward running of the engine.

If desired, some of the output from the pressure intensifier pumps can be led off to other zones presenting extra lubrication problems, as for example the potential scuffing zone of the piston itself.

The invention is not limited to all the details of the construction above described in so far as they may be modified without departing from the scope of the invention.

What is claimed is:

1. A pressure lubrication system for a piston comprising a high pressure system and a low pressure system characterized by a pressure intensifier means located within a gudgeon pin in said piston, means for supplying said intensifier means with lubricant from said low pressure system, complementary structural parts of said piston and said intensifier adapted to be actuated by relative oscillating movement of the gudgeon pin within its bearing to provide cyclic pressure-intensified lubrication impulses thereat.

2. A piston for an engine characterized by a pressure intensifier piston pump means located in a gudgeon pin within the overall dimensions of said piston, complementary pump-actuating means on the piston and gudgeon pin, so constructed as to effect actuation of the intensifier pump through oscillatory relative angular movement of a connecting rod, means for supplying an inlet side of said pressure intensifier pump from a normal pressure lubrication system of the engine and means for conducting the output of the said pressure intensifier pump to a bearing surface of the gudgeon pin.

3. A piston according to claim 2, further characterised in that the pressure intensifier piston pump means is a reciprocating piston pump located in the gudgeon pin.

4. A piston according to claim 2 further characterised by cam means secured to the piston and a complementary tappet located in the gudgeon pin for actuating the intensifier pump piston.

5. A piston according to claim 2 further characterised by spring-return means for the piston of the intensifier pump.

6. A piston according to claim 2 further characterised by at least one supplementary duct leading to another lubrication zone.

7. A piston and gudgeon pin for an internal combustion engine having pressure lubrication and pressure intensifier means for providing cyclic high pressure lubrication for the gudgeon pin, said pin fixed to an engine connecting rod characterized by a pair of intensifier piston pumps located in the gudgeon pin parallel to and off-set from the axis thereof, gudgeon pin end caps secured in the piston, cam formations in said end caps, tappets complementary to said formations in the gudgeon pin, spring return means urging intensifier pump pistons against said tappet, an oil supply duct with non-return valve means located in the gudgeon pin and communicating through the engine connecting rod with the pressure lubrication system of the engine, and outlet ducts from said pressure intensifier pump leading to a load-carrying area of the gudgeon pin.

References Cited

UNITED STATES PATENTS

| 1,910,902 | 5/1933 | McKone | 184—18 |
| 2,899,016 | 8/1959 | Swayze. | |
| 3,313,284 | 4/1967 | Polidan | 123—196 |

HALL C. COE, Primary Examiner

U.S. Cl. X.R.

123—196; 184—14